March 20, 1934.　　C. H. WHITE　　1,951,458
PLANTER
Filed Oct. 31, 1929
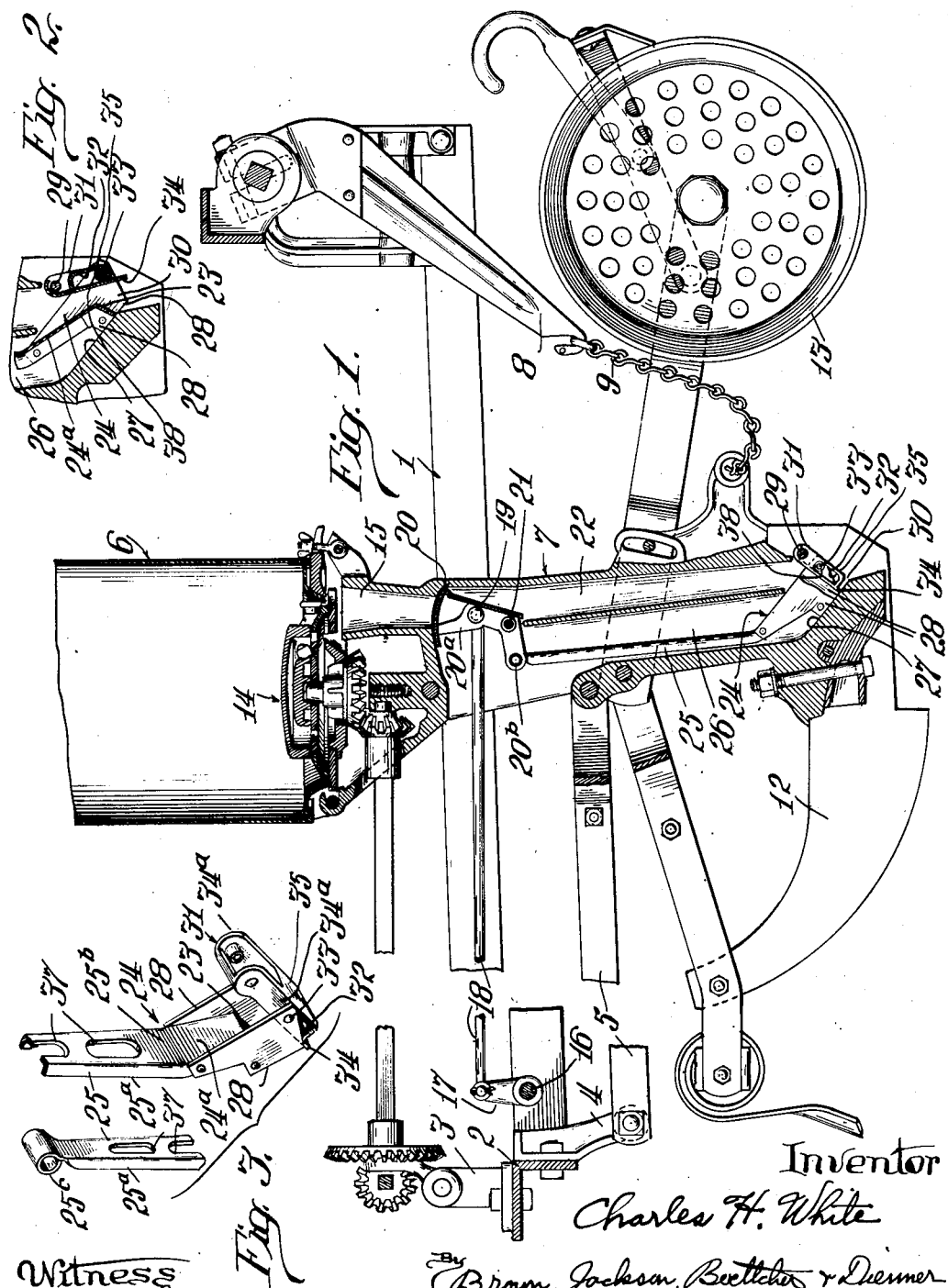
Inventor
Charles H. White
By Brown, Jackson, Boettcher & Dienner
Attorney.

Patented Mar. 20, 1934

1,951,458

UNITED STATES PATENT OFFICE 1,951,458

PLANTER

Charles H. White, Moline, Ill., assignor to Deere & Company, Moline, Ill., a corporation of Illinois Application October 31, 1929, Serial No. 403,698

15 Claims. (Cl. 111—51)

The present invention relates to planting implements designed for check row planting and has particular reference to an improved mechanism for dropping the seed.

One of the principal objects of check row planting is to secure accurately spaced hills transversely of the rows so that the field can be cultivated in two directions, but it is often found that the hills at the ends of the row are out of line, transversely of the direction of planting, by a considerable amount. While not of sufficient amount to cause great trouble in cultivating with horse drawn machinery, it has been discovered that the use of tractor drawn cultivators, particularly the two or three row type, requires a very accurate cross check, and that to have hills out of line at the ends of the rows is decidedly objectionable owing to the higher speed of the tractor cultivator and the difficulty of dodging the hills.

The inaccuracy mentioned above is due to the fact that after the check wire is staked in position preparatory to planting a row, the subsequent passage of the planter along the course serves to stretch the wire, due to the mechanical work the wire performs in tripping the seeding mechanism and the friction in drawing the wire through the check-head and in other moving parts. Initially, the stretch is of no consequence but as the implement traverses the field and the length of wire behind becomes greater the total stretch also becomes proportionately greater. The force being practically constant, the total stretch or increases in length is substantially proportional to the distance back to the anchor stake at the end of the field. For example, where the planter has gone only a short distance the total stretch might only be one-eighth of an inch, but at the far end of the field the total error due to stretch would accumulate to one or two inches or even more depending upon the width of the field. Thus, the last rows planted would be out of line one or two inches or more from the hills transversely opposite, such causing difficulty in cross cultivating at the ends of the rows due to the hills being out of line that amount.

After the end of the row is reached the wire is released and its stake shifted to a position corresponding to the next row. Immediately the wire is released normal tension again exists in the wire and the first hills planted in this row would not be directly opposite the last hills of the preceding row. Subsequently, the planter in passing across the field again would stretch the wire so that by the time the end of that row is reached the error has again accumulated to a substantial amount, such error becoming considerable in the case of a relatively wide field. Another factor tending to cause errors in cross check at the ends of the rows is the greater tension imposed on the wire as the planter approaches the stake at the end of the field, at which time the angle of the wire extending from the planter to the stake increases, such causing greater stretch of the wire at the ends of the rows, as is well understood by those skilled in the art.

Thus it is that although the hills at the center of the field would check the closest the hills at the ends of the rows would be out of line alternately, making cultivation across the ends of the rows rather difficult particularly in the case of tractor cultivators of the two or three row type.

It is one object of my invention, therefore, to provide in a check row planter, seed dropping mechanism so constructed and arranged that the above-mentioned defects are obviated.

Another object of my invention is to so reduce the weight and inertia of the seed dropping mechanism that the resistance offered is considerably reduced, reducing thereby the force required to operate the parts and hence the force acting to objectionally stretch the wire as pointed out above.

These and other objects, apparent from the following description, are attained by my invention, one embodiment of which is hereinafter described and illustrated in the accompanying drawing, in which:

Fig. 1 is a fragmentary sectional view showing parts of a check row planter, and a portion of the seed dropping mechanism in detail;

Fig. 2 is a sectional view showing the lower valve and gate of the seed dropping mechanism in seed depositing position; and Fig. 3 is a broken perspective view showing the lower valve and gate in closed position.

In Fig. 1 the numeral 1 indicates the frame of a check row planter. Inasmuch as this type of planter is old and well known I have not deemed it necessary to completely illustrate the same. Suffice it to say that the frame 1 includes a cross member 2 carrying brackets 3 and 4 which respectively support a part of the driving mechanism for the seed feeding device and the forward end of a link 5 forming a part of the means for pivotally carrying the seed hopper 6, the link 5 preferably forming a part of a parallel link arrangement, such as the one shown and claimed in my copending application, Serial No. 220,473, filed September 19, 1927, by which the runner shank 7 and associated structure may be raised substantially vertically to transport position by any conventional lifting arm construction, indicated by the numerals 8 and 9 in Fig. 1. The runner shank 7 carries forwardly a runner or furrow opener 12 and rearwardly there is a covering wheel 13 which may also serve as a gauge wheel.

The usual seed feeding device is indicated in its entirety in Fig. 1 by the reference numeral 14 and is adapted to drop a predetermined number of seeds into a seed chamber 15 according to the actuation of a seed feeding plate forming a part of the seed feeding device. In the operation as a check row planter, buttons on a wire stretched across the field are adapted to actuate mechanism including the shaft 16 which turns the arm 17 secured thereto, thereby actuating the rod 18. The rod 18 is operatively connected to an upper valve member 19 pivoted at 21 to the runner shank and serves as the means for directly connecting the valve member 19 with the checking mechanism of which the shaft 16 is a part, a pull on the rod 18 opening the valve 19.

The valve member 19 is preferably formed of sheet metal that it may be light and includes a sheet metal plate 20 forming the top and back and carrying a pair of side wings 20a extending forwardly from the back and secured to the top and to which the rod 18 is pivoted, as shown in Fig. 1. The upper valve member 19 is adapted to close the lower end of the seed chamber 15 but when rocked by a pull of the rod or link 18 is adapted to clear the opening of the chamber 15 and allow the accumulation of seeds therein to fall by gravity down the passage 22 where the seeds are received in front of the ejector face 23 of the lower valve member 24, by which they are subsequently discharged through the opening 30 into the furrow. The rod 18 and the link 5 are of substantially equal length and extend forwardly substantially parrallel in order that up and down movement of the runner and associated parts will not affect the timing of the seed dropping mechanism.

Pivotally connected to the upper valve member 19 is a member 25 constituting a part of the lower valve member 24. As clearly disclosed in Fig. 3 the member 25 is of channel section having flanges 25a and a web 25b and is formed, as by pressing, of sheet metal. The web 25b is preferably provided with cut out portions 37 to further reduce the weight and inertia of the lower valve member 24. The member 25 at its lower end is provided with a rearwardly bent portion 24a and a part bent at approximately right angles thereto to form the ejector face 23. The flanges 25a may be continued with the bent portions 23 and 24a for the purpose of fixedly receiving, as by riveting, the side walls or wings 28. The bent portion 24a and the side walls 28 together serve as a flanged ejector having an ejector face 23, the flanges adjacent the ejector face 23 substantially aligning with or fitting the flanges 25a of the channeled push rod 25 and formed oppositely thereto with an open end 30. The side walls or wings 28 have rearwardly extending portions carrying a pin 33, for a purpose to be hereinafter described, and the flanges on the upper part of the member 25 are discontinued that the web 25b may be bent circularly so as to form a hinge 25c for the pin 20b passing through the side wings 20a. The runner shank 7 is provided with a passage way 26 receiving the lower valve member 24, which passage is provided with a rearwardly and downwardly inclined surface 27 which forms a sliding support for the two side walls 28 of the lower valve member 24.

Pivoted to the lower end of the runner shank 7, as by a transverse bolt 29, is a lower gate member 31. As clearly shown in Figs. 2 and 3, the gate member 31 is formed of sheet metal and comprising a plate 34 having side walls 34a. An elongated slot 32 is formed in each of the side walls 34a of the gate member 31, the slots serving to receive the pin 33 carried by the side walls 28 of the lower valve member. The slots 32 are reinforced by a yoke 35 secured to the plate 32 and embracing the pin 33, which is preferably provided with a roller 38 which aids in reducing friction.

From Fig. 1 it will be observed that the lower gate member is inclined downwardly and forwardly to meet the lowermost edge of the valve member 24 and that the plate 34 of the lower gate member 31 serves to deflect the seed falling through the channel 22 to a position on the surface 27 in front of the face 23. Thus when the rod or link 18 is operated, as by being pulled to the left in Fig. 1, the valve member 24 will be moved downwardly which, due to the inclined surface 27 will cause the rearward and downward movement of the ejector face 23 which forcibly expels the seed, the gate member 31 being rocked to the position shown in Fig. 2 by the downward movement of the valve 24. In the normal operation valves 19 and 24 are opened at the same time but the lower valve 24 is closed quickly enough to catch the seed released from the chamber 15 by the valve member 19 as explained above.

I have explained that valve members 19 and 24 and the gate member 31 are all formed of sheet metal, pressed into the form desired. This is for the purpose of making these parts as light as possible, not only to secure instantaneous response to the tripping action of the check wire button, but also and primarily that the drag on the wire will be reduced as much as possible. This drag, as pointed out above, in the ordinary planter causes considerable stretch in the wire which throws the hills at the end of the rows out of line with one another across the field. Coincidental, of course, with making these parts light in weight their inertia is reduced so that less force is required to put them in operation and as the speed of operation of the planter is increased the advantage of the light weight and small inertia is increased even more, approximately as the velocity squared. The number of operating parts and operating joints is also reduced, thereby decreasing still further the inertia of the mechanism and the play between parts. Thus my planter can be efficiently operated within a greater range of speeds because of the instantaneous response of the valve members.

Having thus described my invention and one preferred embodiment of the same, what I claim and desire to secure by Letters Patent is:

1. A planter comprising the combination of a seed feeding device, actuating means therefor, a furrow opener, a shank member, said shank member having a valve controlled chamber to receive seed from said feeding device and a passage leading from said chamber to a point rearwardly of said furrow opener, movable valve means for said chamber comprising a sheet metal plate having angularly related top and back walls and interconnected side walls, said actuating means being connected with said side walls, a second valve means for controlling the outlet from said passage, said last mentioned valve means including a sheet metal gate member having pivotal connection to said shank member and slotted side walls, and a valve member slidably supported within said shank member and having rearwardly extending side walls, operative connections between said movable valve means and said valve member, a pin carried thereby and received by the slotted side walls whereby sliding movement of the valve member occasions pivotal opening movement of the gate member.

2. A planter comprising the combination of a frame, a seed feeding device, a shank member supporting said feeding device, means for raising and lowering said shank member, means including a forwardly extending link pivoted to said shank and to the frame to provide for vertical movement of the shanks relative to the frame, said shank member having a valve controlled chamber to receive seed from said feeding device and a passage leading from said chamber to a point rearwardly of said furrow opener, valve means for said chamber, a rod pivoted to said valve means, said rod being substantially equal in length to said link and extending substantially parallel therewith, whereby rise and fall of said shank member will not affect said valve means, operating means on said frame for said valve means including a member pivoted to said rod and adapted to exert a pull thereon whereby to open said valve means, and a second valve means for controlling the outlet from said passage.

3. In a planter having a seed feeding device and a hollow shank member to receive said seed, the combination of a valve mechanism controlling the passage of the seed through the said shank member, said valve mechanism comprising an upper valve member including a plate forming a back and a forwardly extending top, and a pair of forwardly extending side wings secured to the top and back portions of the plate, an actuating link pivoted to the side wings, a lower valve member comprising a channel member having cut out portions and pivoted to the above mentioned side wings, a rearwardly bent part and a part bent substantially at right angles thereto and forming an ejector face, side walls riveted to the channels, and a gate member pivoted to said shank member adjacent the hollow lower end, said gate member comprising a plate having side walls, said side walls being slotted and provided with a reinforcing member, said side walls of the channel member having a pin provided with a roller thereon, said pin and roller being received by said slots and reinforcing member.

4. In a planter, a seed feeding device having a downwardly extending opening, a runner shank having a horizontally extending opening at its upper end, and an upper valve member comprising an angular plate having forwardly extending side wings arranged to form a bell crank, and with one of the angular walls arranged to close the horizontally extending opening of the runner shank and with the other wall arranged to act as a valve for the downwardly extending opening.

5. A planter including a hollow runner shank, and an ejector mechanism in the runner shank comprising a vertically extending push rod of channel section for lightness, an ejector also of channel section for lightness and having flanges cooperatively fitting with the corresponding flanges of the channeled push rod, and a valve closing the open end of the ejector.

6. A planter including a hollow runner shank, and an ejector mechanism in the runner shank comprising a vertically extending push rod of channel section for lightness, and an ejector comprising a plate having upwardly and rearwardly extending wings substantially aligning with the flanges of the push rod to act as a receptacle for the seed just before it is ejected into the ground.

7. A planter including a seed feeding device having a downwardly extending opening, a hollow runner shank having a vertical partition extending for only a portion of the length of the shank to provide two vertical passageways and connecting passageways at the top and bottom of the shank, an ejector push rod in one vertical passageway extending into the bottom connecting passageway to close it, and a bell crank having an angular plate, one wall of which is adapted to close the top connecting passageway and the other to act as a valve for the downwardly extending opening of the seed feeding device.

8. A planter including a seed feeding device having a downwardly extending opening, a runner shank having a horizontally extending opening at its upper end, and an upper valve member comprising an angular plate having forwardly extending side wings arranged to form a bell crank and with one of the angular walls arranged to close the horizontally extending opening of the runner shank and with the other wall arranged to act as a valve for the downwardly extending opening of the seed feeding device.

9. A planter including a hollow runner shank, and an ejector mechanism in the runner shank comprising a vertically extending push rod of channel section for lightness, the lower end of said channeled push rod terminating in a seed ejecting portion having a face angularly disposed with respect to said push rod, and plates secured to the flanges of the push rod near said face and constituting in cooperation therewith a receptacle for the seed just before it is injected into the ground.

10. A planter comprising the combination of a frame, a seed feeding device, a shank member supporting said feeding device, means for raising and lowering said shank member, means including a longitudinally extending link pivoted to said shank and to the frame to constrain the shank member to move vertically substantially in parallelism, said shank member having a valve controlled chamber to receive seed from said feeding device and a passage leading from said chamber to a point rearwardly of said furrow opener, valve means for said chamber, an actuating rod substantially equal in length to said link pivoted to said valve means and extending longitudinally substantially in parallelism with said link whereby rise and fall of said shank member will not affect said valve means, operating means on said frame for said valve means including a member pivoted to said rod and adapted to exert a force thereon whereby to open said valve means, and a second valve means for controlling the outlet from said passage.

11. In a planter having a seed feeding device and a hollow shank member to receive said seed, the combination of a valve mechanism controlling the passage of the seed through the said shank member, said valve mechanism comprising an upper valve member including a plate forming a back and a top and a pair of side wings secured to the top and back portions of the plate, an actuating link pivoted to the side wings, a lower valve member comprising a channel member having cut out portions and pivoted to the above mentioned side wings, a lower part bent substantially at right angles to the plane of said channel member and forming an ejector face, side walls connected with the channels, a gate member pivoted to said shank member adjacent the hollow lower end, said gate member comprising a flat plate having slotted side walls and means passing through said slotted side walls for pivotally connecting said gate member with said channel member.

12. In a planter, a valve comprising a channel member having cut out portions, a lower part bent substantially at right angles to the plane of said cut out portions and forming an ejector face, and side walls connected with the lower part of said channel member.

13. In a planter, a valve member comprising a channel having an apertured web and flanges at opposite edges, said channel having at its lower end a bent portion terminating in an ejector face disposed substantially at right angles to said bent portion, said flanges continuing along said bent portion, and side walls secured to the flanges adjacent said bent portion and continuing beyond said ejector face to form in connection therewith a seed ejecting chamber.

14. In a planter having a seed feeding device and a hollow shank member to receive said seed, the combination of a valve mechanism controlling the passage of the seed through the said shank member, said valve mechanism comprising an upper valve member including a plate forming a back, a forwardly extending top and a pair of forwardly extending side wings secured to the top and back portions of the plate, an actuating link pivoted to the side wings, a lower valve member comprising a member pivoted to the above mentioned side wings, a rearwardly bent lower part and a part bent substantially at right angles thereto and forming an ejector face, side walls riveted to the channels, and a gate member pivoted to said shank member adjacent the hollow lower end.

15. In a planter having a seed feeding device and a hollow shank member to receive said seed, the combination of a valve mechanism controlling the passage of the seed through the said shank member, said valve mechanism comprising an upper valve member including a plate forming a back, a top and a pair of side wings secured to the top and back portions of the plate, an actuating link pivoted to the side wings, a lower valve member pivoted to the above mentioned side wings, a lower part bent substantially at right angles to the plane of said channel member and forming an ejector face, side walls connected with the channels, a gate member pivoted to said shank member adjacent the hollow lower end, said gate member comprising a flat plate having slotted side walls, and means passing through said slotted side walls for pivotally connecting said gate member with said channel member.

CHARLES H. WHITE.